united States Patent Office 3,468,877
Patented Sept. 23, 1969

3,468,877
FURANO-[4'5';6,7]STEROIDS OF THE ANDROSTANE AND PREGNANE SERIES
Alexander D. Cross, Mexico City, Mexico, assignor to Syntex Corporation, Panama, Panama, a corporation of Panama
No Drawing. Filed Aug. 15, 1966, Ser. No. 572,190
Int. Cl. C07c 173/00, 173/10; A61k 27/00
U.S. Cl. 260—239.5                              12 Claims

ABSTRACT OF THE DISCLOSURE

Furano-[4',5'; 6,7]steroids of the androstane and pregnane series having a furano group fused to the C-6, 7 positions as shown in the following partial formula, the remainder of the structure corresponding to previously disclosed steroids:

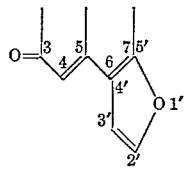

This new group is obtained by epoxidizing a 3β, 7β-diacyloxy-Δ⁵-ene steroid to form a 5α,6α-epoxy-3β,7β-diacyloxy steroid, reacting it with a vinyl Grignard reagent to form a respective 6β-vinyl-3β,5α,7β-triol steroid, epoxidizing the vinyl group to form a respective 6β-oxirano-3β,5α,7β-triol steroid, oxidizing this to 5α-hydroxy-6β-oxirano-3,7-dione, and cyclizing the last named compound to form the furano-[4',5';6,7]-3-deto-Δ⁴-ene steroid. The products has the hormonal activities and uses of the respective parent steroids.

---

This invention relates to novel steroids and to a process for the preparation thereof. More specifically, it relates to furano-[4',5'; 6,7]steroids of the androstane and pregnane series containing a furano moiety fused to the C-6 and C-7 carbon atoms of the steroid nucleus. These steroids demonstrate hormonal activities characteristic of the parent steroids. These physiologically active steroids of the present invention may be represented by the following partial formula wherein the novel feature is adequately shown.

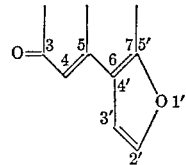

Heretofore, steroids of the androstane and pregnane series, containing the furano moiety fused to other carbon atoms, have been shown to be deprived of hormonal activity. For example, the introduction of the furano moiety fused to the C-3 and C-4 carbon atoms in testosterone propionate resulted in loss of anabolic activity altogether [S. Julia and C. Moutonnier, Bull. Soc. Chim., 979 (1964)].

Included in this interesting series of (physiologically active) compounds of the present invention are steroids of the androstane and pregnane series which contain additional substituents and groupings known to those skilled in the art. For example, in the androstane series of compounds, including the 19-nor analogs, such known groupings as a 3-keto-Δ⁴-ene, and elaborations of the 3-keto group, e.g. a 3β-hydroxy, a 3β-ether such as tetrahydropyran-2-yloxy, tetrahydrofuran-2-yloxy or a 3β-ester such as acetoxy, propionoxy and the like, are encompassed. In addition, substituents such as a 17-keto group or elaborations thereof, e.g. a 17α-lower alkyl, alkenyl, or alkynyl substituents, a 17β-ol and functional derivatives of the 17β-ol, e.g. a 17β-ester or a 17β-ether such as mentioned hereinbefore for the 3β-ether and 3β-ester, are encompassed in this invention. Preferably, the compounds of the androstane and 19-nor androstane series contain the 3-keto-Δ⁴-ene grouping in combination with a 17β-ol and a 17α-methyl, a 17α-ethyl, a 17α-vinyl or a 17α-ethynyl substituent. These substituents are introduced by conventional techniques subsequent to those reactions introducing the furano moiety.

In addition, however, the furano steroids of the androstane series may optionally contain additionally newer groupings demonstrating a favorable influence on the biological activity of these compounds. These groupings thus include such combinations as a 1,2-dimethyl grouping, a 2α, 17α-dimethyl grouping, a 2-hydroxymethylene grouping, a 2-oxa-3-keto-Δ⁴-ene grouping, a 19-nor-18-lower alkyl combination, and a 1-methyl-3-keto-Δ¹,⁴ grouping. Additional elaborations as detailed above may be present in these compounds.

Illustrative of the novel furano androstanes containing the above combination and elaboration of known substituents are those compounds shown by the following representative formula:

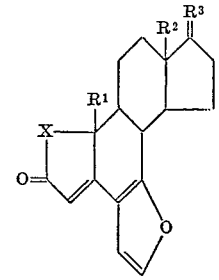

wherein:

R¹ is hydrogen or methyl;
R² is lower alkyl;
R³ is oxo or the group

in which R⁴ is hydrogen, tetrahydropyran-2-yl, tetrahydrofuran-2-yl, or a hydrocarbon carboxylic acyloxy group containing less than 12 carbon atoms, and R⁵ is hydrogen, lower alkyl, alkenyl or alkynyl; and X is the group

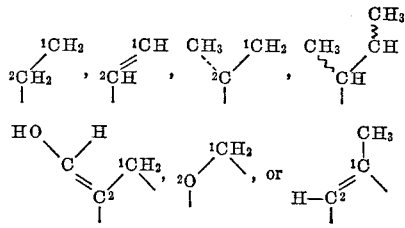

The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The above steroids of the androstane and 19-norandrostane series are anabolic agents having a favorable anabolic-androgen ratio and are useful post-operatively and in geriatrics to enhance tissue build up. In addition, the above steroids of the androstane and 19-norandrostane series, bearing a 17α-ethynyl, vinyl or ethyl substituent, are progestational agents and are useful in oral contraception.

In addition to the standard 3-keto-Δ⁴-ene grouping and elaborations of the 3-keto group as described hereinabove for the androstane series, in the pregnane and 19-norpregnane series of novel furano steroids, such additional groupings or combinations of groupings are present, which are known to those skilled in the art. The novel furano steroids of this series contain, for example, a 16 substituent such as alkyl, alkylene, hydroxy, or the like, preferably a 16α-methyl, a 16β-methyl, a 16α-hydroxy, or a 16-methylene in combination with a 17β-acetyl substituent, a 17α-hydroxy-17β-acetyl grouping and elaborations of the latter, such as the known 17α-esters, such as 17α-acetoxy, 17α-caproyloxy, and the like, and a 16α,17α-dihydroxy combination and its elaborations such as the 16α,17α-acetonide.

In addition, however, the furano steroids of the pregnane series may optionally contain other groupings which have demonstrated a favorable influence on the biological activity of these progestational compounds. These groupings include a Δ¹-dehydro system, a 1α,2α-methylene substituent, or a 17α-lower alkyl group.

Steroids of the pregnane series containing the furano moiety and above combinations and elaborations at the 1, 2, 3, 16 and 17 positions of the steroid nucleus, are progestational agents with anti-estrogenic activity and are useful in fertility control and the management of various menstrual disorders. Preferably, the furano steroids, demonstrating progestational activity, contain a 3-keto-Δ⁴-ene grouping in combination with a 17α-hydroxy group and its 17α-acyloxy elaborations, a 16α,17α-dihydroxy grouping and its 16α,17α-ketal elaborations, or a 16-methyl substituent along with the 17α-hydroxy or 17α-acyloxy group.

Illustrative of the novel furano steroids of the pregnane series, demonstrating hormonal activities characteristic of proestational agents, are those compounds shown by the following representative formula:

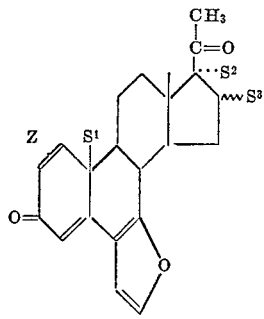

wherein:

$S^1$ is hydrogen or methyl;
$S^2$ is hydrogen, hydroxy, lower alkyl or a hydrocarbon carboxylic acyloxy group containing less than 12 carbon atoms;
$S^3$ is hydrogen, α-methyl, β-methyl, α-hydroxy or methylene;
$S^2$ and $S^3$ together is the group

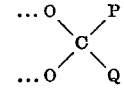

in which

P is hydrogen or lower alkyl and Q is hydrogen, lower alkyl or aryl of up to 8 carbon atoms;

Z is a carbon-carbon single bond, a carbon-carbon double bond or a methylene group fused to C-1 and C-2 atoms and having the α-configuration; $S^1$ being methyl when Z is the methylene group or the carbon-carbon double bond.

Also, the novel furano steroids of the pregnane series contain such known combinations and elaborations involving an 11β-hydroxy group, a 9α-fluoro group, a Δ¹-dehydro system, a 16 substituent such as α-hydroxy, methyl, methylene and the like, a 16α,17α-dihydroxy grouping and the known elaborations, a 16α,17α-acetonide, a 2-hydroxymethylene, a [3,2-c]-pyrazole, a 17α,21-dihydroxy-20-one side chain and elaborations thereof, such as a 17,20; 20,21-bismethylenedioxy protecting group, for example, a 21-ester, a 21-ether, or a 17α-ester group. Steroids possessing the latter combination and elaboration of substituents are anti-inflammatory agents and are useful in the treatment of rheumatoid arthritis and skin conditions such as acne, dermatitis and the like. Preferably, the furano steroids, demonstrating anti-inflammatory activity, contain a 3-keto-Δ⁴-ene grouping, and elaborations of the 3-keto group, in combination with an 11β-hydroxy group, a 9α-hydrogen or fluoro substituent, a Δ¹-dehydro system, a 17α,21-dihydroxy grouping and its acyloxy elaborations, a 16-methyl substituent or a 16α,17α-hydroxy groupings and its 16α,17α-acetonide elaboration.

Illustrative of the novel furano steroids of the pregnane series, demonstrating hormonal activities characteristic of corticoids, are compounds shown by the following representative formula:

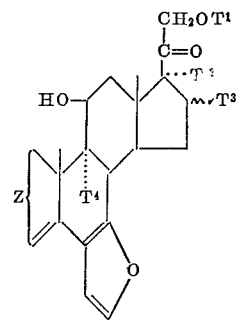

wherein:

$T^1$ is hydrogen, tetrahydropyran-2-yl, tetrahydrofuran-2-yl or a hydrocarbon carboxylic acyl group containing less than 12 carbon atoms;
$T^2$ is hydroxy or a hydrocarbon carboxylic acid acyloxy group containing less than 12 carbon atoms;
$T^3$ is hydrogen, hydroxy, or methyl;
$T^2$ and $T^3$ together is the group

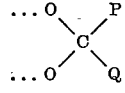

in which

P is hydrogen or lower alkyl and Q is hydrogen, lower alkyl or aryl of up to 8 carbon atoms;
$T^4$ is hydrogen or fluoro; and
Z is the group

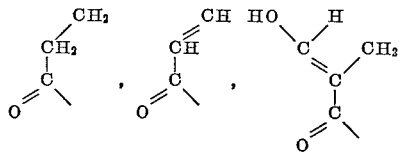

or

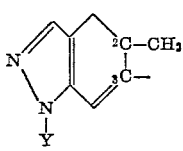

in which Y is hydrogen, phenyl or p-fluorophenyl.

In the process of the present invention, substituents and groupings at the side chain are protected during the introduction of the novel furano moiety and regenerated subsequently. A bismethylenedioxy protecting group is routinely used in protecting the side chain of the corticoid steroids. In the process, a 20-keto group in the pregnane series of progestational compounds or a 17-keto group in the androstane series, is converted to a hydroxy group and subsequently to the acetoxy group prior to the introduction of the furano moiety and regenerated subsequently. Hence, the steroids of the present invention are prepared by a process illustrated by the partial formulas shown below.

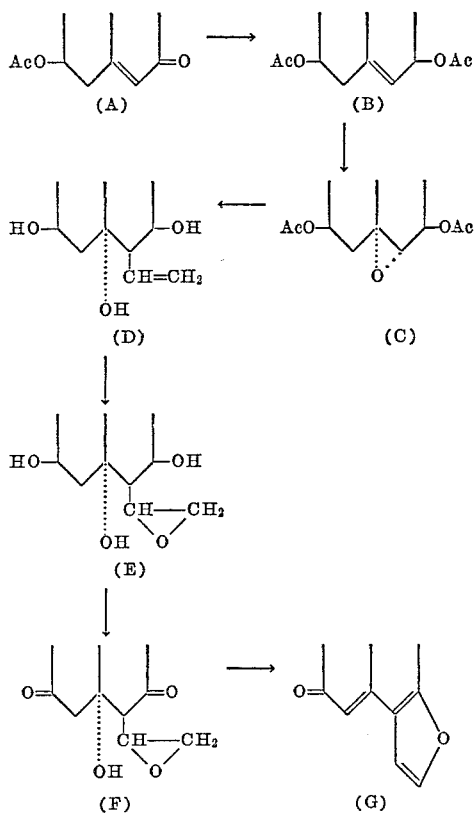

The starting material for the preparation of the novel steroids, namely a 3β-acyloxy-Δ⁵-en-7-one steroid of the androstane or pregnane series, including the 19-nor analogs thereof, is reduced to a 3β-acyloxy-Δ⁵-en-7β-ol intermediate by conventional treatment with an alkali metal hydride in an inert solvent. The intermediate is acetylated to form a 3β,7β-diacyloxy-Δ⁵-ene steroid of Formula B. For example, a convenient technique is the reduction with sodium borohydride in methanol followed by treatment with a hydrocarbon carboxylic acid anhydride, preferably acetic anhydride, in pyridine.

A 5α,6α-oxide group is introduced by treatment of the compounds of Formula B with an organic peracid in an inert, organic solvent. Peracids such as peracetic acid, perbenzoic acid, monoperthalic acid, p-nitroperbenzoic acid, m-chloroperbenzoic acid or the like, in chloroform, tetrahydrofuran, dioxane ether or the like, are useful. A preferred combination is monoperthalic acid and chloroform. The reaction is performed at room temperature for a period of about 20 hours.

To the above formed epoxide is then added a solution of a vinyl Grignard reagent in an inert solvent followed by a reaction time of about 6 hours at a reaction temperature carried out at the reflux temperature of solvent system in use. The preferable Grignard reagent is vinyl magnesium bromide in tetrahydrofuran (H. Normant, Bull. Soc. Chim., p. 728, 1957 and p. 1764, 1959). Subsequent decomposition of the Grignard reagent and alkaline hydrolysis of the 3β and 7β-acetoxy groups, such as with potassium hydroxide in aqueous methanol, potassium bicarbonate in aqueous methanol, or the like, afford a vinyl triol of Formula D, namely a 6β-vinyl-3β,5α,7β-triol steroid.

The latter vinyl triol steroid is converted by treatment with the epoxidation procedure mentioned before to a 6β-oxirano steroid represented by Formula E. Thus, the vinyl triol of Formula D is treated with an organic peracid in an inert, organic solvent as described hereinabove to form the 6β-oxirano compound. A preferred combination for this latter epoxidation reaction is m-chloroperbenzoic acid in ether.

The latter material in a solvent such as acetone is oxidized immediately by treatment with a conventional oxidizing agent such as the Jones reagent, chromic oxide in pyridine or the like, to convert the 3β and 7β-dihydroxy group to the corresponding 3 and 7-diketo groups, thereby affording a 5α-hydroxy-6β-oxirano-3,7-dione steroid represented by Formula F. Preferably the Jones reagent is used and the reaction is conducted for a period of about ½ hour at a low temperature of about 0° C.

By treatment of the compounds of Formula F with a Lewis acid, an inorganic acid or organic acid in an inert, organic solvent, thereby effecting cyclization, there is formed a corresponding furano moiety fused to the C–6 and C–7 carbon atoms of the steroid nucleus. For example, boron trifluoride-etherate in tetrahydrofuran, hydrochloric acid gas in dioxane, zinc chloride in benzene, a trace of perchloric acid in dioxane and the like, readily effects the cyclization of those compounds of Formula F to afford the novel compounds containing a furano moiety fused to the C–6 and C–7 carbon atoms of the steroid nucleus represented by Formula G. The Lewis acid, boron trifluoride-etherate in tetrahydrofuran is preferred.

Subsequent to the introduction of the novel furano moiety at the C–6 and C–7 carbon atoms, modification and elaborations of the substituents on the A and/or D rings are performed. Thus, regeneration of a 17-keto group in the androstane series, regeneration of a 20-keto group in the pregnane series, and hydrolysis of a bismethylenedioxy protecting group to reform the 17α,21-dihydroxy-20-one side chain characteristic of the corticoid series of compounds, are performed. Then other elaborations of substituents on the A or D ring may be performed by those skilled in the art of steroid chemistry. At this point for example, a Δ¹-dehydro system, the 17α-ester, the 21-ether, the 21-ester, the 16α,17-acetonide and the like, are introduced, as preferred, by conventional techniques known to those skilled in the art of steroid chemistry.

The following examples serve to illustrate the invention but are not necessarily intended to limit the scope thereof.

Preparation A.—3β-acetoxy-Δ⁵-en-7-ones

A solution of 5 g. of 1α,2α-dimethyl-17β-hydroxy-androst-4-en-3-one in 50 ml. of acetic anhydride and 50 ml. of acetyl chloride is heated at reflux for 4 hours under nitrogen. The reaction mixture is then distilled to almost dryness, cooled and diluted with ether. The organic phase is washed with water, aqueous 5% sodium bicarbonate solution and again with water, dried over sodium sulfate and evaporated to yield 1α,2α-dimethyl-3β,17β-diacetoxy-androsta-3,5-diene which may be recrystallized from acetone:hexane.

A solution of 6 g. of the latter compound in 100 ml.

of 95% ethanol and 35 ml. of tetrahydrofuran is cooled to 10° C. and added dropwise over a 1 hour period to a stirred, cooled solution of 6 g. of sodium borohydride in 50 ml. of 80% ethanol, the reaction temperature being maintained below 5° C. Upon completion of addition, the solution is allowed to stand at 0° C. to 5° C. for 2 hours. Two hundred milliliters of 10% sodium hydroxide solution are then added and the solution heated at the boiling point for 15 minutes. The solvent is evaporated under reduced pressure and the residue is acidified with 20% hydrochloric acid. The solid which forms is collected by filtration, washed with water and dried to yield 1α,2α-dimethylandrost-5-ene-3β,17β diol which may be further purified by recrystallization from acetone.

A mixture of 1 g. of the latter material, 4 ml. of pyridine and 2 ml. of acetic anhydride is allowed to stand at room temperature for 15 hours. The mixture is then poured into ice water and the solid which forms is collected by filtration, washed with water and dried to yield 1α,2α-dimethyl-3β,17β-diacetoxyandrost-5-ene which may be further purified through recrystallization from acetone: hexane.

A solution of the tert-butyl chromate reagent is prepared by adding 5 g. of chromic anhydride in small portions to a stirred and chilled mixture of 10 ml. of tert-butyl alcohol and 10 ml. of carbon tetrachloride. The mixture is then diluted with an additional 65 ml. of carbon tetrachloride, filtered through a layer of anhydrous sodium sulfate on a sintered-glass funnel and stored at 4° C. over anhydrous sodium sulfate. To a solution of 1 g. of the latter compound, 10 ml. of carbon tetrachloride at 60° C. is added a mixture of 10 ml. of the above tert-butyl chromate solution, 3 ml. of acetic anhydride, and 2 ml. of acetic acid. The reaction mixture is held at 65–70° C. for a period of 16 hours, cooled to 20–25° C. and filtered to remove inorganic salts. To the filtrate is added 10 ml. of a 20% aqueous solution of oxalic acid and 2 ml. of methanol. The organic phase is separated, dried over sodium sulfate and evaporated to dryness to yield 1α,2α-dimethyl-3β,17β-diacetoxyandrost-5-en-7-one.

Utilizing the same procedure, the following Δ⁴-en-3-ones are converted to the corresponding 3β-acetoxy-Δ⁵-en-7-one starting materials.

| Δ⁴-en-3-ones | 3β-acetoxy-Δ⁵-en-7-ones |
|---|---|
| 17β-hydroxy-19-norandrost-4-en-3-one. | 3β,17β-diacetoxy-19-norandrost-5-en-7-one. |
| 1α,2α-dimethyl-17β-hydroxy-androst-4-en-3-one. | 1α,2α-dimethyl-3β,7β-diacetoxy-androst-5-en-7-one. |
| 2-oxa-17β-hydroxyandrost-4-en-3-one. | 2-oxa-3β,17β-diacetoxyandrost-5-en-7-one. |
| 2α-methyl-17β-hydroxyandrost-4-en-3-one. | 2α-methyl-3β,17β-diacetoxy-androst-5-en-7-one. |
| 1α-methyl-17β-hydroxy-androst-4-en-3-one. | 1α-methyl-3β,17β-diacetoxy-androst-5-en-7-one. |
| 17α-hydroxyprogesterone. | 3β,20-diacetoxy-17α-hydroxy-pregn-5-en-7-one. |
| 19-norprogesterone. | 3β,20-diacetoxy-19-norpregn-5-en-7-one. |
| 9α-fluoro-17,20;20,21-bismethyl-enedioxypregn-4-ene-3,11-dione. | 3β-acetoxy-9α-fluoro-17,20;20,21-bismethylenedioxypregn-5-ene-7,11-dione. |
| 9α-fluoro-16α-methyl-17,20;20,21-bismethylenedioxypregn-4-ene-3,11-dione. | 3β-acetoxy-9α-fluoro-16α-methyl-17,20;20,21-bismethylenedioxy-pregn-5-ene-7,11-dione. |
| 17,20;20,21-bismethylenedioxy-pregn-4-ene-3,11-dione. | 3β-acetoxy-17,20;20,21-bismethyl-enedioxypregn-5-ene-7,11-dione. |
| 16α-methyl-17,20;20,21-bismethyl-enedioxypregn-4-ene-3,11-dione. | 3β-acetoxy-16α-methyl-17,20;20,21-bismethylenedioxypregn-5-ene-7,11-dione. |
| 18-methyl-17β-hydroxy-19-nor-androst-4-en-3-one. | 3β,17β-diacetoxy-18-methyl-19-norandrost-5-en-7-one. |
| 18-ethyl-17β-hydroxy-19-nor-androst-4-en-3-one. | 3β,17β-diacetoxy-18-ethyl-19-norandrost-5-en-7-one. |
| 16-methylene-17α-hydroxypregn-4-ene-3,20-dione. | 3β,20-diacetoxy-16-methylene-17α-hydroxypregn-5-en-7-one. |
| 17α-methylpregn-4-ene-3,20-dione. | 3β,20-diacetoxy-17α-methyl-pregn-5-en-7-one. |

Example 1.—Furano-[4',5';6,7]-androst-4-ene-3,17-dione and the 19-nor analog

A solution of 1 g. of sodium borohydride in 3 ml. of water is added to an ice-cooled solution of 1 g. of 3β,17β-diacetoxyandrost-5-en-7-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β,17β-diacetoxyandrost-5-en-7β-ol which may be further purified by recrystallization from acetone: hexane.

A mixture of 1 g. of the latter compound, 4 ml. of pyridine and 2 ml. of acetic anhydride is allowed to stand at room temperature for 15 hours. The mixture is then poured into ice water and the solid which forms is collected by filtration, washed and dried to yield 3β-7β, 17β-trisacetoxy-androst-5-ene which may be further purified through recrystallization from acetonehexane.

A solution of 2.5 g. of the latter compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3β,7β,17β-trisacetoxy-5α-6α-oxidoandrostane which may be further purified by recrystallization from acetone: hexane.

To a solution of vinyl magnesium bromide, prepared from 7.7 g. of magnesium, 40 g. of vinyl bromide in 40 g. of tetrahydrofuran, in 275 ml. of xylene, is added a solution of 10 g. of 3β,7β,17β-trisacetoxy-5α,6α-oxidoandrostane in 100 ml. of tetrahydrofuran. The reaction mixture is heated at reflux for a period of 24 hours and then treated with a cold aqueous solution of ammonium chloride. The reaction product is extracted with ether, dried and evaporated.

A solution of 1 g. of the latter mixture in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 6β-vinylandrostane-3β,5α,7β, 17β-tetraol which is recrystallized from methylene chloride: ether.

A solution of 1 g. of the latter compound in 120 ml. of chloroform is cooled to 0° C. and mixed with a solution of 1.1 molar equivalents of m-chloroperbenzoic acid in ether. The mixture is allowed to stand at room temperature for a period of 22 hours and then diluted with water. The organic layer is separated, washed with aqueous sodium bicarbonate solution and then with water to neutrality, dried over sodium sulfate and evaporated to dryness to yield 6β-oxirano-androstane-3β,5α,7β,17β-tetraol.

To a stirred solution of 1 g. of the latter compound in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 6β-oxirano-5α-hydroxyandrostane-3,7,17-trione which may be further purified by recrystallization from acetone-hexane.

A solution of 1 g. of the latter compound in 10 ml. of tetrahydrofuran and 20 ml. of diethyl ether is treated with 1 g. of boron trifluoride etherate in 5 ml. of tetrahydrofuran. The reaction mixture is allowed to stand at room temperature for a period of 3 hours. The organic phase is separated, washed with aqueous sodium bicarbonate solution, dried over sodium sulfate and evaporated to dryness to yield furano-[4',5';6,7]-androst-4-ene-3,17-dione which is recrystallized from benzene: acetone.

Utilizing the above procedure, 3β,17β-diacetoxy-19- norandrost-5-en-7-one is converted to furano-[4',5';6,7]-19-norandrost-4-ene-3,17-dione.

Example 2.—Furano-[4',5';6,7] steriods

Utilizing the same procedure as Example 1, the following 3β-acetoxy-Δ⁵-en-7-ones are converted to the corresponding furano-[4',5';6,7] analog.

| 3β-acetoxy-Δ⁵-en-7-ones | Furano-[4',5';6,7]steroids |
|---|---|
| 3β,17β-diacetoxy-19-norandrost-5-en-7-one. | Furano-[4',5';6,7]-19-norandrost-4-en-3,17-dione. |
| 1α,2α-dimethyl-3β,7β-diacetoxyandrost-5-en-7-one. | 1α,2α-dimethylfurano-[4',5';6,7]-androst-4-en-3,17-dione. |
| 2-oxa-3β,17β-diacetoxyandrost-5-en-7-one. | 2-oxa-furano-[4',5';6,7]-androst-4-en-3,17-dione. |
| 2α-methyl-3β,17β-diacetoxyandrost-5-en-7-one. | 2α-methyl-furano-[4',5';6,7]-androst-4-en-3,17-dione. |
| 1α-methyl-3β,17β-diacetoxyandrost-5-en-7-one. | 1α-methyl-furano-[4',5';6,7]-androst-4-en-3,17-dione. |
| 3β,20-diacetoxy-17α-hydroxypregn-5-en-7-one. | Furano-[4',5';6,7]-17α-hydroxy-pregn-4-ene-3,20-dione. |
| 3β,20-diacetoxy-19-norpregn-5-en-7-one. | Furano-[4',5';6,7]-19-norpregn-4-ene-3,20-dione. |
| 3β-acetoxy-9α-fluoro-17,20;20,21-bismethylenedioxypregn-5-ene-7,11-dione. | Furano-[4',5';6,7]-9α-fluoro-11β-hydroxy-17,20;20,21-bismethyl-enedioxypregn-4-en-3-one. |
| 3β-acetoxy-9α-fluoro-16α-methyl-17,20;20,21-bismethylenedioxypregn-5-ene-7,11-dione. | Furano-[4',5';6,7]-9α-fluoro-11β-hydroxy-16α-methyl-17,20;20,21-bismethylenedioxypregn-4-en-3-one. |
| 3β-acetoxy-17,20;20,21-bismethyl-enedioxypregn-5-ene-7,11-dione. | Furano-[4',5';6,7]-11β-hydroxy-17,20;20,21-bismethylenedioxy-pregn-4-en-3-one. |
| 3β-acetoxy-16α-methyl-17,20;20,21-bismethylenedioxypregn-5-ene-7,11-dione. | Furano-[4',5';6,7]-11β-hydroxy-16α-methyl-17,20;20,21-bis-methylenedioxypregn-4-en-3-one. |
| 3β-17β-diacetoxy-18-methyl-19-norandrost-5-en-7-one. | Furano-[4',5';6,7]-18-methyl-19-norandrost-4-ene-3,17-dione. |
| 3β,17β-diacetoxy-18-ethyl-19-norandrost-5-en-7-one. | Furano-[4',5';6,7]-18-ethyl-19-norandrost-4-ene-3,17-dione. |
| 3β,20-diacetoxy-16-methylene-17α-hydroxypregn-5-en-7-one. | Furano-[4',5';6,7]-16-methylene-17α-hydroxypregn-4-ene-3,20-dione. |
| 3β,20-diacetoxy-17α-methylpregn-5-en-7-one. | Furano-[4',5';6,7]-17α-methyl-pregn-4-ene-3,20-dione. |

Example 3.—Furano-[4',5';6,7]-17α-methyl-17β-hydroxyandrost-4-en-3-one and the 19-nor analog A mixture of 1 g. of furano-[4',5';6,7]-androst-4-ene-3,17-dione, 25 ml. of dry benzene, 5 ml. of ethylene glycol and 50 mg. of oxalic acid is refluxed for 16 hours using a water separator. The reaction mixture is then washed with aqueous sodium bicarbonate solution and water, dried and evaporated to dryness to yield 3,3'-ethylenedioxy-furano-[4',5';6,7]-androst-4-en-17-one.

A solution of 5 g. of the latter compound in 250 ml. of thiophene-free benzene is treated with an equimolar amount of methyl-magnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3,3'-ethylenedioxyfurano - [4',5';6,7] - 17α - methylandrost - 4 - en - 17β-ol which is recrystallized from methylene chloride:hexane.

A mixture of 0.5 g. of the latter compound and 0.5 g. of magnesium sulfate in 50 ml. of benzene is heated at reflux for a period of 20 hours and then poured into ice water and extracted with ethyl acetate. The organic phase is dried and evaporated to dryness to yield furano-[4',5'; 6,7]-17α-methyl-17β-hydroxy-androst-4-en-3-one.

Utilizing the above procedure, furano-[4',5';6,7]-19-norandrost-4-ene-3,17-dione is converted to furano-[4',5'; 6,7]-17α-methyl-17β-hydroxy-19-norandrost-4-en-3-one.

Example 4.—Furano-[4',5';6,7]-17α-ethyl-17β-hydroxyandrost-4-en-3-one and the 19-nor analog A mixture of 2 g. of furano-[4',5';6,7]-androst-4-ene-3,17-dione in 30 ml. of dry benzene and 70 mg. of oxalic acid is heated at reflux with distillation for one hour. The mixture is then cooled, diluted with water and extracted with ethyl acetate. The extracts are washed to neutrality, dried and evaporated to dryness to yield furano-[4',5'; 6,7] - 3,3'-ethylenedioxyandrost-4-en-17-one which is recrystallized from acetone:hexane.

To a stirred solution of 2 g. of the latter compound in 250 ml. of absolute ether is added in a dropwise fashion, and under nitrogen, an ethereal solution of 10 molar equivalents of ethyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield furano-[4',5';6,7]-3,3-ethylenedioxy-17α-ethylandrost-4-en-17β-ol which is further purified through recrystallization from acetone:hexane.

A mixture of 0.5 g. of the latter compound and 0.5 g. of magnesium sulfate in 50 ml. of benzene is heated at reflux for a period of 20 hours and then poured into ice water and extracted with ethyl acetate. These extracts are washed with water to neutrality, dried over sodium sulfate and evaporated to dryness. The residue is triturated with ether to yield furano - [4',5';6,7]-17α-ethyl-17β-hydroxyandrost-4-en-3-one which is recrystallized from acetone:hexane.

Utilizing the same procedure, furano - [4',5';6,7]-19-norandrost-4-ene-3,17-dione is converted to furano-[4',5'; 6,7]-17α-ethyl-17β-hydroxyandrost-4-en-3-one.

Example 5.—Furano-[4',5';6,7]-17α-ethynyl-17β-hydroxyandrost-4-en-3-one and the 19-nor analog A solution of 1 g. of furano-[4',5';6,7]-3,3'-ethylenedioxyandrost-4-en-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields furano - [4',5';6,7]-3,3'-ethylenedioxy-17α-ethynylandrost-4-en-17β-ol which is recrystallized from acetone: hexane.

A mixture of 0.5 g. of the latter compound and 0.5 g. of magnesium sulfate in 50 ml. of benzene is heated at reflux for a period of 20 hours and then poured into ice water and extracted with ethyl acetate. These extracts are washed with water to neutrality, dried over sodium sulfate and evaporated to dryness. The residue is triturated with ether to yield furano-[4',5';6,7]-17α-ethynyl-17β-hydroxyandrost-4-en-3-one which is recrystallized from acetone: hexane.

Utilizing the same procedure, furano - [4',5';6,7]-3,3'-ethylenedioxy-19-norandrost-4-en-17-one is converted to furano - [4',5';6,7] - 17α-ethynyl-17β-hydroxy-19-norandrost-4-en-3-one.

Example 6.—Furano-[4',5';6,7]-17α-vinyl-17β-hydroxyandrost-4-en-3-one and the 19-nor analog To a solution of vinyl magnesium bromide in tetrahydrofuran (prepared according to the procedure of H. Normant, Bull. Soc. Chim. 1957, p. 728; 1959, p. 1964) is added a solution of 10 g. of furano-[4',5';6,7]-3,3'-ethylenedioxyandrost-4-en-17-one in 100 ml. of tetrahydrofuran. The reaction mixture is heated at reflux for a period of 5 hours, after which time it is treated with an aqueous ammonium chloride solution. The product is extracted with ether, dried and evaporated to dryness to yield furano - [4',5';6,7]-3,3'-ethylenedioxy-17α-vinylandrost-4-en-17β-ol.

A mixture of 0.5 g. of the latter compound and 0.5 g. of magnesium sulfate in 50 ml. of benzene is heated at reflux for a period of 20 hours and then poured into ice water and extracted with ethyl acetate. These extracts are washed with water to neutrality, dried over sodium sulfate and evaporated to dryness. The residue is triturated with ether to yield furano - [4',5';6,7]-17α-vinyl-17β-hydroxyandrost-4-en-3-one which is recrystallized from acetone:hexane.

Utilizing the same procedure, furano-[4',5';6,7]-3,3'-ethylenedioxy-19-norandrost-4-en-17-one is converted to furano - [4',5';6,7]-17α-vinyl-17β-hydroxy-19-norandrost-4-en-3-one.

Example 7.—Furano-[4',5';6,7]-3β-tetrahydropyran-2-yloxyandrost-4-en-17β-ol and the 19-nor analog A mixture of 1 g. of furano - [4',5';6,7] - 17β - hydroxyandrost - 4 - en - 3 - one, 4 ml. of pyridine and 2 ml. of acetic anhydride is allowed to stand at room temperature for 15 hours. The mixture is then poured into ice water and the solid which forms is collected by filtration, washed with water and dried to yield furano - [4',5';6,7] - 17β - acetoxyandrost - 4 - en - 3 - one which may be further purified through recrystallization from actone:hexane.

A solution of 2 g. of the latter compound in 20 ml. of anhydrous tetrahydrofuran is cooled to 75° C. in a dry ice-acetone bath and treated with a previously cooled solution of 0.6 g. of lithium aluminum t-butoxide in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield furano - [4',5';6,7]-17β - acetoxyandrost - 4 - en - 3β - ol.

Two milliliters of dihydropyran are added to a solution of 1 g. of the latter compound in 15 ml. of benzene. About 1 ml. is removed by distillation to remove moisture and 0.4 g. of p - toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield furano - [4',5';6,7] - 3β - (tetrahydropyran - 2' - yloxy)-17β - acetoxyandrost-4-ene which is recrystallized from pentene.

A solution of 1 g. of the latter compound in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield furano - [4',5';6,7]-3β-(tetrahydropyran - 2' - yloxy) - androst - 4 - en - 17β-ol which is recrystallized from methylene chloride:ether.

Utilizing the same procedure, furano - [4',5';6,7]-19-norandrost - 4 - ene - 3,17 - dione is converted to furano - [4',5';6,7] - 3β - (tetrahydropyran - 2' - yloxy)-19-norandrost-4-en-17β-ol.

Example 8.—Furano-[4',5';6,7]-pregn-4-ene-3,20-dione and the 19-nor analog

A solution of 1 g. of sodium borohydride in 3 ml. of water is added to an ice-cooled solution of 1 g. of 3β - acetoxypregn - 5 - ene - 7,20 - dione in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β - acetoxypregn - 5 - ene - 7β,20β - diol which may be further purified by recrystallization from actone:hexane.

A mixture of 1 g. of the latter compound, 4 ml. of pyridine, and 2 ml. of acetic anhydride is allowed to stand at room temperature for 15 hours. The mixture is then poured into ice water and the solid which forms is collected by filtration, washed with water and dried to yield 3β,7β,20β - trisacetoxypregn - 5 ene which may be further purified through recrystallization from acetone:hexane.

A solution of 2.5 g. of the latter compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3β,7β,20β - trisacetoxy - 5α,6α - oxidopregnane which may be further purified by recrystallization from acetone:hexane.

To a solution of vinyl magnesium bromide, prepared from 7.7 g. of magnesium, 40 g. of vinyl bromide in 40 g. of tetrahydrofuran, in 275 ml. of tetrahydrofuran, is added a solution of 10 g. of 3β,7β,20β - trisacetoxy - 5α,6α - oxidopregnane in 100 ml. of tetrahydrofuran. The reaction mixture is heated at reflux for a period of 24 hours and then treated with a cold aqueous solution of ammonium chloride. The reaction product is extracted with ether, dried and evaporated.

A solution of 1 g. of the latter mixture in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 6β - vinylpregnane - 3β,5α,7β,20 - tetraol which is recrystallized from methylene chloride:ether.

A solution of 1 g. of the latter compound in 120 ml. of chloroform is cooled to 0° C. and mixed with a solution of 1.1 molar equivalents of m - chloroperbenzoic acid in ether. The mixture is allowed to stand at room temperature for a period of 22 hours and then diluted with water. The organic layer is separated, washed with aqueous sodium bicarbonate solution and then with water to neutrality, dried over sodium sulfate and evaporated to dryness to yield 6β - oxiranopregnane - 3β,5α,7β,20-tetraol.

To a stirred solution of 1 g. of the latter compound in 10 ml. of acetone, cooled to 0° C., is added under nitrogen, a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 6β - oxirano - 5α - hydroxypregnane-3,7,20 - trione which may be further purified by recrystallization from acetone:hexane.

A solution of 1 g. of the latter compound in 10 ml. of tetrahydrofuran and 20 ml. of diethyl ether is treated with 1 g. of boron trifluoride etherate in 5 ml. of tetrahydrofuran. The reaction mixture is allowed to stand at room temperature for a period of 3 hours. The organic phase is separated, washed with aqueous sodium bicarbonate solution, dried over sodium sulfate and evaporated to dryness to yield furano-[4',5';6,7]-pregn-4-ene-3,20-dione which is recrystallized from benzene:acetone.

Utilizing the above procedure, 3β-20-diacetoxy-19-norpregn-5-en-7-one is converted to furano-[4',5';6,7]-19-norpregn-4-ene-3,20-dione.

Example 9.—Furano-[4',5';6,7]-17α-hydroxypregn-4-ene-3,20-dione and the 19-nor analog A solution of 1 g. of sodium borohydride in 3 ml. of water is added to an ice-cooled solution of 1 g. of 3β,20-diacetoxy-17α-hydroxypregn-5-en-3-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β,20-diacetoxy-7β,17α-dihydroxypregn - 5 - ene which may be further purified by recrystallization from acetone:hexane.

A mixture of 1 g. of the latter compound, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and these extracts are dried and evaporated to yield 3β,7β,17α,20-tetraacetoxypregn-5-ene which is recrystallized from acetone:ether.

A solution of 2.5 g. of the latter compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3β,7β,17α,20 - tetraacetoxy - 5α,6α-oxidopregnane which may be further purified by recrystallization from acetone:hexane.

To a solution of vinyl magnesium bromide, prepared from 7.7 g. of magnesium, 40 g. of vinyl bromide in 40 g. of tetrahydrofuran, in 275 ml. of xylene, is added a solution of 10 g. of the latter compound in 100 ml. of tetrahydrofuran. The reaction mixture is heated at reflux for a period of 24 hours and then treated with a cold aqueous solution of ammonium chloride. The reaction product is extracted with ether, dried and evaporated.

A solution of 1 g. of the latter mixture in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 6β-vinylpregnane-3β,5α,7β, 17α, 20-pentaol which is recrystallized from methylene chloride:ether.

A solution of 1 g. of the latter compound in 120 ml. of chloroform is cooled to 0° C. and mixed with a solution of 1.1 molar equivalents of m-chloroperbenzoic acid in ether. The mixture is allowed to stand at room temperature for a period of 22 hours and then diluted with water. The organic layer is separated, washed with aqueous sodium bicarbonate solution and then with water to neutrality, dried over sodium sulfate and evaporated to dryness to yield 6β-oxirano-pregnane-3β,5α,7β,17α,20-pentaol.

To a stirred solution of 1 g. of the above compound in 20 ml. of pyridine is added a solution of pyridinium chromate, previously prepared by adding slowly 1 g. of chromic oxide to 20 ml. of pyridine at 0° C. The reaction mixture is allowed to stand at room temperature for a period of 18 hours, and then diluted by adding 20 ml. of ethyl acetate. The mixture is washed with water, then dilute acid, dried and evaporated to yield 6β-oxirano-5α, 17α-dihydroxy-pregnane-3,7,20-trione which may be further crystallized from acetone:hexane.

A solution of 1 g. of the latter compound in 10 ml. of tetrahydrofuran and 20 ml. of diethyl ether is treated with 1 g. of boron trifluoride etherate in 5 ml. of tetrahydrofuran. The reaction mixture is allowed to stand at room temperature for a period of 3 hours. The organic phase is separated, washed with aqueous sodium bicarbonate solution, dried over sodium sulfate and evaporated to dryness to yield furano-[4',5';6,7]-17α-hydroxypregn-4 - ene - 3,20 - dione which is recrystallized from benzene:acetone.

Utilizing the same procedure, 3β,20-diacetoxy-19-norpregn-5-en-7-one is converted to furano-[4',5';6,7]-17α-hydroxy-19-norpregn-4-ene-3,20-dione.

Example 10.—Furano-[4',5';6,7]-17α-acyloxypregn-4-ene-3,20-dione and the 19-nor analogs A mixture of 1 g. of furano-[4',5';6,7]-17α-hydroxypregn-4-ene-3,20-dione, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried and evaporated to yield furano-[4',5';6,7]-17α-acetoxypregn-4-ene-3,20-dione which is recrystallized from acetone:ether.

Utilizing the above procedure, furano-[4',5';6,7]-17α-hydroxy-19-norpregn-4-ene-3,20-dione is converted to furano - [4',5';6,7]-17α-acetoxy-19-norpregn-4-ene-3,20-dione.

Utilizing the above two starting materials and the same procedure but substituting propionic, enanthic and valeric anhydride, there are obtained the corresponding 17α-propionoxy, 17α-enanthyloxy and 17α-valeryloxy pregnanes and 19-nor analogs.

Example 11.—Furano-[4',5';6,7]-17α-caproyloxypregn-4-ene-3,20-dione and the 19-nor analog To a solution of 5 g. of furano-[4',5';6,7]-17α-hydroxy-pregn-4-ene-3,20-dione in 100 ml. of anhydrous benzene are added 1 g. of p-toluenesulfonic acid and 10 ml. of caproic anhydride. The mixture is allowed to stand for 24 hours at room temperature and poured with stirring into ice and water. The organic phase is separated, washed with 10% sodium carbonate solution and with water, dried and evaporated to yield furano-[4',5';6,7]-17α-caproyloxypregn-4-ene-3,20-dione which is further purified through recrystallization from ether:hexane.

Utilizing the same procedure, furano-[4',5';6,7]-17α-hydroxy-19-norpregn-4-ene-3,20-dione is converted to furano - [4',5';6,7] - 17α-caproyloxy-17-norpregn-4-ene-3,20-dione.

Example 12.—Furano-[4',5';6,7]-16α,17α-dihydroxy-pregn-4-ene-3,20-dione and the 19-nor analog A culture of *Streptomyces roseochromogenus* ATCC 3347 is prepared in an inclined agar medium containing 1% of glucose and 1% of yeast extract. One milliliter of a suspension of this culture is then employed to inoculate each of a series of 250 ml. flasks containing 50 ml. of a sterilized aqueous medium of 2% peptone and 5% corn syrup. The mixtures are then incubated at 28° C. for from 24 to 48 hours with agitation and aeration.

Ten milligrams of furano-[4',5';6,7]-17α-hydroxy-pregn-4-ene-3,20-dione are added to each 50 ml. of the above vegetating culture of *Streptomyces roseochromogenus*. The mixture is stirred for from 48 to 72 hours with aeration and then extracted several times with methylene chloride. These extracts are washed with water, dried over sodium sulfate, filtered and evaporated under reduced pressure and the residue is then chromatographed on silica gel to yield furano-[4',5';6,7]-16α,17α-dihydroxypregn-4-ene-3,20-dione.

Utilizing the same procedure, furano-[4',5';6,7]-17α-hydroxy-19-norpregn-4-ene-3,20-dione is converted to furano - [4',5';6,7] - 16α,17α-dihydroxy-19-norpregn-4-ene-3,20-dione.

Example 13.—Furano-[4',5';6,7]-16α,17α-isopropylidene-dioxypregn-4-ene-3,20-dione and the 19-nor analog To 120 ml. of acetone containing 1 g. of furano-[4',5';6,7]-16α,17α-dihydroxypregn-4-ene-3,20-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields furano-[4',5';6,7]-16α,17α-isopropylidene-dioxypregn-4-ene-3,20-dione which is recrystallized from methanol.

Utilizing the same procedure, furano-[4',5';6,7]-16α, 17α-dihydroxy-19-norpregn-4-ene-3,20-dione is converted to furano - [4',5';6,7] - 16α,17α-isopropylidenedioxy-19-norpregn-4-ene-3,20-dione.

Example 14.—Furano-[4',5';6,7]-16α,17α-phenylethylidenedioxypregn-4-ene-3,20-dione and the 19-nor analog A mixture of 1 g. of furano-[4',5';6,7]-16α,17α-dihydroxypregn-4-ene-3,20-dione, 50 ml. of freshly distilled acetophenone and 0.5 ml. of 72% perchloric acid is stirred at room temperature for 1 hour. The resulting mixture is washed with sodium bicarbonate solution and with water to neutrality, steam distilled and extracted with methylene chloride. These extracts are dried over sodium sulfate and evaporated to dryness to yield furano-[4',5';6,7] - 16α,17α - phenylethylidenedioxypregn-4-ene-3,20-dione which may be recrystallized from acetone: hexane.

Utilizing the same procedure, furano-[4',5';6,7]-16α, 17α-dihydroxy-19-norpregn-4-ene-3,20-dione is converted to furano - [4',5';6,7]-16α,17α-phenylethylidenedioxy-19-norpregn-4-ene-3,20-dione.

Example 15.—Furano - [4',5';6,7]-3β-tetrahydropyran-2-yloxy-17α-acetoxypregn-4-en-20-one and the 19-nor analog A solution of 200 mg. of furano-[4',5';6,7]-17α-acetoxypregn-4-ene-3,20-dione in 32 ml. of anhydrous isopropanol and 25 mg. of sodium borohydride is stirred at room temperature for 15 hours. One-hundred ml. of water is added and the resulting suspension extracted several times with ether. The ether phase is dried over sodium sulfate and evaporated to dryness under reduced pressure to yield furano-[4',5';6,7]-3β-hydroxy-17α-acetoxypregn-4-en-20-one which may be further purified by recrystallization from ether.

Two milliliters of dihydropyran are added to a solution of 1 g. of the latter compound in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield furano-[4',5';6,7]-3β - tetrahydropyran-2-yloxy-17α-acetoxypregn-4-en-20-one which is recrystallized from pentane.

Utilizing the same procedure, furano-[4',5';6,7]-17α-acetoxy-19-norpregn-4-ene-3,20-dione is converted to furano - [4',5';6,7] - 3β - tetrahydropyran-2-yloxy-17α-acetoxy-19-norpregn-4-en-20-one.

Example 16.—Furano - [4',5';6,1]-pregna-1,4-diene-3,20-dione; furano-[4',5'; 6.7]-17α-hydroxypregna-1,4-diene-3,20 - dione; and furano-[4',5';6,7]-17α-acetoxypregna-1,4-diene-3,20-dione A mixture of 0.5 g. of furano-[4',5';6,7]-pregn-4-ene-3,20-dione, 10 ml. of dioxane and 0.35 g. of 2,3-di-chloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield furano-[4',5';6,7]-pregna-1,4-diene-3,20-dione which is further purified by recrystallization from acetone: hexane.

Utilizing the same procedure, furano-[4',5';6,7]-17α-hydroxypregn-4-ene-3,20-dione and furano-[4',5';6,7]-17α-acetoxypregn-4-ene-3,20-dione are converted to furano - [4',5';6,7]-17α-hydroxypregna-1,4-diene-3,20-dione and furano-[4',5';6,7]-17α-acetoxypregna-1,4-diene-3,20-dione.

Example 17.—Furano - [4',5';6,7]-cyclopropano-[2'',3''; 1,2]-17α-hydroxypregn-4-ene-3,20-dione and the 17α-acetoxy analog One gram of furano-[4',5';6,7]-17α-hydroxypregn-4-ene-3,20-dione in 50 ml. of ethyl acetate is hydrogenated for 15 hours with 0.3 g. of 5% palladium-on-charcoal catalyst at atmospheric pressure and room temperature. The catalyst is then removed by filtration and the filtrate evaporated to yield furano-[4',5';6,7]-17α-hydroxy-5α-pregnane-3,20-dione which is recrystallized from acetone.

To a stirred solution of 1 g. of the latter compound in 50 ml. of chloroform at $-40°$ C. is added a solution of 0.6 g. of bromine in 50 ml. of chloroform over a period of 15 minutes. The reaction mixture is allowed to stand at room temperature and then poured into 500 ml. of ice water containing 2 g. of sodium thiosulfate. The organic phase is washed with water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield furano-[4',5';6,7]-3β,17β,20-trihydroxy-5α-pregn-1-ene which may be recrystallized from cyclohexane: ethyl acetate.

A solution of 17.2 cc. of potassium hydroxide (40%) and 5.7 g. of nitrosomethyl urea in 100 ml. of ether is reacted at $-5°$ C. To the ethereal phase is added 1 g. of the latter compound and the solution is allowed to stand at room temperature for 6 days. Thereafter, the solution is filtered and the filtrate evaporated at room temperature under vacuum to remove the ether. Chromatography on silica gel yields the corresponding 1,2-pyrazoline compound. The compound thus obtained is heated under high vacuum at a temperature of 140° C. After 10 minutes the pyrolysis is complete, giving furano-[4',5';6,7] - 1α,2α - methylene-3β,17β,20-trihydroxy-5α-pregnane which can be purified by crystallization from cyclohexane-ethyl acetate.

To a stirred solution of 1 g. of the latter compound in 10 ml. of acetone, cooled to 0° C., is added under nitrogen, a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield furano - [4',5';6,7] - 1α, 2α-methylene-17α-hydroxy-5α-pregnane-3,20-dione which may be further purified by recrystallization from acetone:hexane.

One equivalent of bromine in 15 ml. of glacial acetic acid are added dropwise to a solution of 1 g. of the latter compound in 25 ml. of acetic acid containing a few drops of 4 N hydrogen bromide in acetic acid. After being allowed to stand for the five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is combined with 10 ml. of collidine and refluxed for 30 minutes. The cooled solution is filtered and the filtrate is diluted with ether, washed with dilute hydrochloric acid, aqueous sodium bicarbonate solution and water. The dried organic phase is evaporated to yield furano-[4',5';6,7]-1α,2α-methylene-17α-hydroxypregn-4-ene-3,20-dione which is recrystallized from ether:hexane.

Utilizing the same procedure, furano-[4',5';6,7]-17α-acetoxypregn-4-ene-3,20-dione is converted to furano-[4',5';6,7] - 1α,2α - methylene-17α-acetoxypregn-4-ene-3,20-dione.

Example 18.—Furano-[4',5'; 6,7]-11β,17α,21-trihydroxypregn-4-ene-3,20-dione and the 16α-methyl analog, the 9α-fluoro analog and the 9α-fluoro-16α-methyl analog A solution of 1 g. of 3β-acetoxy-17,20;20,21-bis-methylenedioxypregn-5-ene-7,11-dione in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β-acetoxy-7β,11β - dihydroxy-17,20;20,21-bismethylenedioxypregn-5-ene which may be further purified through recrystallization from acetone:hexane.

A mixture of 1 g. of the latter compound, 4 ml. of pyridine and 2 ml. of acetic anhydride is allowed to stand at room temperature for 15 hours. The mixture is then poured into ice water and the solid which forms is collected by filtration, washed with water and dried to yield 3β,7β-bisacetoxy-11β-hydroxy - 17,20;20,21 - bismethylenedioxypregn-5-ene which may be further purified through recrystallization from acetone:hexane.

A solution of 2.5 g. of the latter compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3β,7β-bisacetoxy-5α,6α-oxido - 11β - hydroxy - 17,20;20,21-bismethylenedioxypregna which may be further purified by recrystallization from acetone:hexane.

To a solution of vinyl magnesium bromide, prepared from 7.7 g. of magnesium, 40 g. of vinyl bromide in 40 g. of tetrahydrofuran, in 275 ml. of tetrahydrofuran, is added a solution of 10 g. of 3β,7β-bisacetoxy-5α,6α-oxido-11β - hydroxy-17,20;20,21-bismethylenedioxypregnane in 100 ml. of tetrahydrofuran. The reaction mixture is heated at reflux for a period of 5 hours and then treated with a cold aqueous solution of ammonium chloride. The reaction product is extracted with ether, dried and evaporated to dryness to yield 3β,7β-bisacetoxy-5α,11β-dihydroxy-6β-vinyl - 17,20;20,21 - bismethylenedioxypregnane which is recrystallized from acetone:methanol.

A solution of 1 g. of the latter compound in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 6β-vinyl-17,20;20,21-bismethylenedioxypregnane-3β,5α,7β,11β-tetraol which is recrystallized from methylene chloride:ether.

A solution of 1 g. of the latter compound in 120 ml. of chloroform is cooled to 0° C. and mixed with a solution of 1.1 molar equivalents of m-chloroperbenzoic acid in ether. The mixture is allowed to stand at room temperature for a period of 22 hours and then diluted with water. The organic layer is separated, washed with aqueous sodium bicarbonate solution and then with water to neutrality, dried over sodium sulfate and evaporated to dryness to yield 6β-oxirano - 17,20;20,21 - bismethylenedioxypregnane-3β,5α,7β,11β-tetraol.

To a stirred solution of 1 g. of the latter compound in 10 ml. of acetone, cooled to 0° C., is added under nitrogen, a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 6β-oxirano-5α-hydroxy-17,20;20,21-bismethylenedioxypregna - 3,7,11-trione which may be further purified by recrystallization from acetone:hexane.

A solution of 1 g. of the latter compound in 10 ml. of tetrahydrofuran and 20 ml. of diethyl ether is treated with 1 g. of boron trifluoride etherate in 5 ml. of tetrahydrofuran. The reaction mixture is allowed to stand at room temperature for a period of 3 hours. The organic phase is separated, washed with aqueous sodium bicarbonate solution, dried over sodium sulfate and evaporated to dryness to yield furano-[4',5';6,7]-17,20;20,21-bismethylenedioxypregn-4-ene-3,11-dione which is recrystallized from benzene:actone.

A solution of 1 g. of the latter compound in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield furano-[4',5';6,7,]-17,20;20,21 - bismethylenedioxypregn-4-ene-3β,11β-diol which may be further purified through recrystallization from acetone:hexane.

One gram of the latter compound in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield furano-[4',5';6,7]-11β-hydroxy-17,20;20,21-bismethylenedioxypregn-4-en - 3 - one which may be further purified through recrystallization from acetone:hexane.

A suspension of 1 g. of the latter compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane: ethyl acetate to yield furano-[4',5';6,7]-11β,17α,21-trihydroxypregn-4-ene-3,20-dione which may be further purified through recrystallization from isopropanol.

Utilizing the same procedure, the following starting materials, namely,

3β-acetoxy-9α-fluoro-17,20;20,21-bismethylenedioxypregn-5-ene-7,11-dione;

3β-acetoxy-16α-methyl-17,20;20,21-bismethylenedioxypregn-5-ene-7,11-dione; and

3β - acetoxy-9α-fluoro-16α-methyl-17,20;20,21-bis-methylenedioxypregn-5-ene-7,11-dione, are converted to the final products furano-[4',5';6,7]-9α-fluoro-11β,17α,21-trihydroxypregn-4-ene-3,20-dione;

furano-[4',5';6,7]-16α-methyl-11β,17α,21-trihydroxypregn-4-ene-3,20-dione; and furano-[4',5';6,7]-9α-fluoro-16α-methyl-11β,17α,21-trihydroxypregn-4-ene-3,20-dione, respectively.

Example 19.—21-esters

A mixture of 1 g. of furano-[4',5';6,7]-9α-fluoro-16α-methyl - 11β,17α,21 - trihydroxypregna-1,4-diene-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield furano-[4',5';6,7]-9α-fluoro-16α-methyl-11β, 17α - dihydroxy - 21-acetoxypregna-1,4-diene-3,20-dione which may be further purified through recrystallization from acetone:hexane.

Utilizing the same starting material and the same procedure but substituting caproic anhydride, enanthic anhydride and propionic anhydride, there are obtained the corresponding 21-caproate, 21-enanthate and 21-propionates, respectively.

In a similar fashion, those final products of Example 17 are converted to the corresponding 21-esters by the above procedure.

Example 20.—Furano-[4',5';6,7]-11β,17α,21-trihydroxypregna-1,4-diene-3,20-dione, and the 16α-methyl analog, the 9α-fluoro analog, and the 9α-fluoro-16α-methyl analog A mixture of 1 g. of furano-[4',5';6,7]-11β-17α-dihydroxy-21-acetoxypregn-4-ene-3,20-dione, 1 g. of 2,3-dichloro-5,6-dicyanobenzoquinone and 50 ml. of dioxane are refluxed under nitrogen for 24 hours. The mixture is then cooled, washed with a cold aqueous solution of 10% sodium hydroxide until the washings were colorless, dried over sodium sulfate and evaporated. Chromatography of the residue on silica gel yields furano-[4',5';6,7]-11β-17α-dihydroxy-21-acetoxypregna-1,4-diene-3,20-dione which may be further purified through recrystallization from acetone:hexane.

A suspension of 1 g. of the latter compound in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield furano-[4',5';6,7]-11β,17α,21-trihydroxypregna-1,4-diene-3,20-dione which is recrystallized from acetone:hexane.

Utilizing the same procedure, the starting materials furano-[4',5';6,7]-16α-methyl-11β,17α-dihydroxy-21-acetoxypregn-4-ene-3,20-dione;
furano-[4',5';6,7]-9α-fluoro-11β,17α-dihydroxy-21-acetoxypregn-4-ene-3,20-dione; and
furano-[4',5';6,7]-9α-fluoro-16α-methyl-11β,17α-dihydroxy-21-acetoxypregn-4-ene-3,20-dione;

are converted to the following final products, namely, furano-[4',5';6,7]-16α-methyl-11β,17α,21-trihydroxypregna-1,4-diene-3,20-dione;
furano-[4',5';6,7]-9α-fluoro-11β,17α,21-trihydroxypregna-1,4-diene-3,20-dione; and
furano-[4',5';6,7]-9α-fluoro-16α-methyl-11β,17α,21-trihydroxypregna-1,4-diene-3,20-dione, respectively.

Example 21.—21-ethers

Two milliliters of dihydropyran are added to a solution of 1 g. of furano-[4',5';6,7]-11β,17α,21-trihydroxypregna-1,4-diene-3,20-dione in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield furano-[4',5';6,7]-11β,17α-dihydroxy-21-(tetrahydropyran-2-yloxy) pregna-1,4-diene-3,20-dione which is recrystallized from pentane.

Utilizing the above starting material and the same procedure but substituting dihydrofuran in place of the dihydropyran, there is obtained furano-[4',5';6,7]-11β,17α-dihydroxy-21-(tetrahydrofuran-2-yloxy)-pregna-1,4-diene-3,20-dione.

In a similar fashion, those starting materials of Examples 17 and 19 are converted to the corresponding 21-ethers, namely the 21-(tetrahydropyran-2-yloxy) and 21-(tetrahydrofuran-2-yloxy) compounds.

Example 22.—2-hydroxymethylene and [3,2-c] pyrazole steroids

To a stirred solution of 3 g. of furano-[4',5';6,7]-11β,17α-dihydroxy-21-(tetrahydropyran-2-yloxy) pregn-4-ene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield furano-[4',5';6,7]-2-hydroxymethylene-11β,17α-dihydroxy-21-(tetrahydropyran-2'-yloxy)-pregn-4-ene-3,20-dione which is recrystallized from ethylene chloride:hexane.

A mixture of the 2-hydroxymethylene derivative, 2 g. of sodium acetate, 100 ml. of aqueous methanol and 1 ml. of phenylhydrazine hydrochloride is allowed to stand under nitrogen at 0° C. for 24 hours. Acetic acid (2 ml.) is added and the mixture is allowed to stand for another 4 hours. The reaction mixture is diluted with ethyl acetate and washed with 2 N sodium hydroxide and water. The ethyl acetate extracts are dried, concentrated and chromatographed over silica, eluting with benzene to afford furano-[4',5';6,7]-11β,17α-dihydroxy-21-(tetrahydropyran-2'-yloxy)-2''-phenyl-4-pregneno-[3,2-c]pyrazole.

To a solution of 1 g. of the latter compound in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield furano-[4',5';6,7]-11β,17α,21-trihydroxy-2''-phenyl-4-pregneno-[3,2-c]pyrazole which is recrystallized from acetone:hexane.

Utilizing the above procedure, the following starting materials, namely, furano-[4',5';6,7]-9α-fluoro-11β,17α-dihydroxy-21-(tetrahydropyran-2-yloxy)-pregn-4-ene-3,20-dione;
furano-[4',5';6,7]-16α-methyl-11β,17α-dihydroxy-21-(tetrahydropyran-2-yloxy)-pregn-4-ene-3,20-dione; and
furano-[4',5';6,7]-9α-fluoro-16α-methyl-11β,17α-dihydroxy-21-(tetrahydropyran-2-yloxy)-pregn-4-ene-3,20-dione;

are converted to the final products, namely, furano-[4',5';6,7]-9α-fluoro-11β,17α,21-trihydroxy-2''-phenyl-4-pregneno-[3,2-c]pyrazole;
furano-[4',5';6,7]-16α-methyl-11β,17α,21-trihydroxy-2''-phenyl-4-pregneno-[3,2-c]pyrazole; and
furano-[4',5';6,7]-9α-fluoro-16α-methyl-11β,17α,21-trihydroxy-2''-phenyl-4-pregneno-[3,2-c]pyrazole, respectively.

Utilizing the above starting material and the same procedure but substituting an equivalent amount of p-fluorophenylhydrazine hydrochloride, and then an equivalent amount of hydrazine hydrate in place of the phenylhydrazine hydrochloride, there are obtained the corresponding 2''-(p-fluorophenyl)-4-pregneno-[3,2-c]pyrazole and 4-pregneno-[3,2-c]pyrazole analogs, respectively.

Example 23.—16α,17α-dihydroxy compounds and the corresponding 16α,17α-acetonides A culture of *Streptomyces roseochromogenus* ATCC 3347 is prepared in an inclined agar medium containing 1% of glucose and 1% of yeast extract. One milliliter of a suspension of this culture is then employed to inoculate each of a series of 250 ml. flasks containing 50 ml. of a sterilized aqueous medium of 2% peptone and 5% corn syrup. The mixtures are then incubated at 28° C. for from 24 to 48 hours with agitation and aeration.

Ten milligrams of furano-[4',5';6,7]-9α-fluoro-11β,17α-dihydroxy-21-acetoxypregna-1,4-diene-3,20-dione are added to each 50 ml. of the above vegetating culture of *Streptomyces roseochromogenus*. The mixture is stirred for from 48 to 72 hours with areation and then extracted several times with methylene chloride. These extracts are washed with water, dried over sodium sulfate, filtered and evaporated under reduced pressure and the residue is then chromatographed on silica gel to yield furano-[4',5';6,7]-9α - fluoro-11β,16α,17α-trihydroxy-21-acetoxypregna-1,4-diene-3,20-dione.

To 120 ml. of acetone containing 1 g. of the latter compound are added 30 drops of 70% perchloric acid. The mixture is allowed to stand 1 hour at room temperature, 30 drops of pyridine are added and the solution is evaporated to dryness under reduced pressure. Thirty milliliters of water are added to the rsidue and this mixture is extracted several times with ethyl acetate. The combined extracts are washed to neutrality with water, dried over sodium sulfate and evaporated to dryness. The residue upon trituration with methanol yields furano-[4',5';6,7]-9α - fluoro-11β-hydroxy-16α,17α-isopropylidenedioxy-21-acetoxypregna-1,4-diene-3,20-dione which is recrystalized from methanol.

Utilizing the same procedure, the other 21-acetoxy compounds of pregn-4-ene and of pregna-1,4-diene (prepared as final products in Example 18) are converted to the corresponding 16α,17α-isopropylidenedioxy compounds.

Example 24.—16α,17α-phenylethylidenedioxy compounds

A mixture of 1 g. of furano-[4',5';6,7]-11β,16α,17α-trihydroxy-21-acetoxypregna-1,4-diene-3,20-dione, 50 ml. of freshly distilled acetophenone and 0.5 ml. of 72% perchloric acid is stirred at room temperature for 1 hour. The resulting mixture is washed with sodium bicarbonate solution and with water to neutrality, steam distilled and extracted with methylene chloride. These extracts are dried over sodium sulfate and evaporated to dryness to yield furano-[4',5';6,7]-11β-hydroxy-16α,17α-phenylethylidenedioxy-21-acetoxypregna-1,4-diene-3,20-dione which may be recrystallized from acetone:hexane.

Utilizing the above procedure, the 21-acetoxy compounds of pregn-4-ene and of pregna-1,4-diene (prepared as final products in Example 18) are converted to the corresponding 16α,17α-phenylethylidenedioxy compounds.

Example 25.—Furano-[4',5';6,7]-androsta-1,4-diene-3,17-dione and 17α-ethynyl-17β-hydroxy analog A mixture of 0.5 g. of furano-[4',5';6,7]-androst-4-ene-3,17-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield furano-[4',5';6,7]-androsta-1,4-diene-3,17-dione which is further purified by recrystallization from acetone:hexane.

Utilizing the same procedure, furano-[4',5';6,7]-17α-ethynyl-17β-hydroxyandrost-4-en-3-one is converted to furano - [4',5';6,7] - 17α - ethynyl - 17β - hydroxyandrosta-1,4-dien-3-one.

Example 26.—Furano-[4',5';6,7]-2-hydroxymethyleneandrosta-4-ene-3,17-dione

To a stirred solution of 3 g. of furano-[4',5';6,7]-androst-4-ene-3,17-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield furano-[4',5';6,7]-2-hydroxymethylene androst-4-ene-3,17-dione which is recrystallized from methylene chloride:hexane.

Example 27.—21-pivalates

A mixture of 2 g. of furano-[4',5';6,7]-11β,17α,21-trihydroxypregna-1,4-diene-3,20-dione in 8 ml. of pyridine and 4 ml. of trimethylacetyl chloride is heated at steam bath temperatures for one hour. The mixture is then poured into ice water. The solid which forms is collected by filtration, washed with water, heated and dried to yield furano - [4',5';6,7] - 11β,17α - dihydroxy-21-trimethylacetoxypregna-1,4-diene-3,20-dione.

Utilizing the same procedure, the 21-hydroxy compounds of Examples 18 and 20 are converted to the corresponding 21-pivalates. Notably among these are the following:

furano-[4',5';6,7]-9α-fluoro-11β,17α-dihydroxy-21-trimethylacetoxypregna-1,4-diene-3,20-dione;

furano-[4',5';6,7]-16α-methyl-11β,17α-dihydroxy-21-trimethylacetoxypregna-1,4-diene-3,20-dione; and furano-[4',5';6,7]-9α-fluoro-16α-methyl-11β,17α-dihydroxy-21-trimethylacetoxypregna-1,4-diene-3,20-dione, respectively.

The novel furano androstanes are anabolic agents having a favorable anabolic-androgenic ratio and are useful post-operatively and in geriatrics to enhance tissue build-up. In addition, the furano androstanes bearing a 17α-ethynyl, vinyl or ethyl substituent, are progestational agents and useful in oral contraception. The novel furano pregnanes, as exemplified on pages 6 and 7, are progestational agents and are useful in fertility control and the management of various menstrual disorders. In addition, the furano pregnanes demonstrate hormonal properties characteristic of anti-androgenic, anti-gonadotrophic and anti-estrogenic agents. The novel furano pregnanes, as exemplified on pages 8 and 9, are cortical hormones with high anti-inflammatory and low catabolic activities and are useful in the treatment of rheumatoid arthritis, contact dermatitis, allergies and the like. The furano steroids of the present invention are administered via usual routes, i.e. orally, topically or parenterally in pharmaceutically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

What is claimed is:

1. A process for the preparation of a furano-[4',5';6,7]-3-keto-Δ⁴-ene steroid of the androstane and pregnane series which comprises treating a 3β,7β-diacyloxy-Δ⁵-ene steroid with an organic peracid to form a corresponding 5α,6α-epoxy-3β,7β-diacyloxy steroid, reacting said epoxy steroid with a vinyl Grignard reagent to form a corresponding 6β-vinyl-3β,5α,7β-triol steroid, treating the vinyl group in the latter compound with an organic peracid to form a corresponding 6β-oxirano-3β,5α,7β-triol steroid, oxidizing the latter triol steroid to form a 5α-hydroxy-6β-oxirano-3,7-dione steroid, and cyclizing the latter steroid by treatment with an acid to form the furano-[4',5';6,7]-3-keto-Δ⁴-ene steroid.

2. A steroid of the androstane series having the formula:

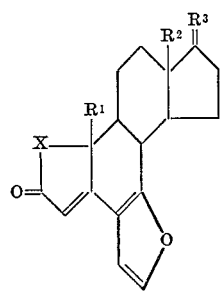

wherein $R^1$ is hydrogen or methyl; $R^2$ is lower alkyl; $R^3$ is oxo or the group $$R^4O-\overset{R^5}{\underset{\vdots}{C}}$$

in which $R^4$ is hydrogen, tetrahydropyran-2-yl, tetrahydrofuran-2-yl or a hydrocarbon carboxylic acyloxy group containing less than twelve carbon atoms, and $R^5$ is hydrogen, lower alkyl, alkenyl or alkynyl; and X is the group

[structures shown]

or

[structures shown]

3. A compound according to claim 2 wherein each of $R^1$, and $R^2$ is methyl; $R^3$ is the group $$R^4O-\overset{R^5}{\underset{\vdots}{C}}$$

in which each of $R^4$ and $R^5$ is hydrogen; and X is the group

[structure]

4. A compound according to claim 2 wherein each of $R^1$ and $R^2$ is methyl; $R^3$ is the group $$R^4O-\overset{R^5}{\underset{\vdots}{C}}$$

in which $R^4$ is hydrogen; and $R^5$ is ethynyl.

5. A steroid of the pregnane series having the formula:

[steroid structure]

wherein $S^1$ is hydrogen or methyl; $S^2$ is hydrogen, hydroxy, lower alkyl or a hydrocarbon carboxylic acyloxy group containing less than 12 carbon atoms; $S^3$ is hydrogen, α-methyl, β-methyl, α-hydroxy or methylene; $S^2$ and $S^3$ together is the group $$\overset{\cdots O}{\underset{\vdots\cdot O}{>}}C\overset{P}{\underset{Q}{<}}$$

in which P is hydrogen or lower alkyl and Q is hydrogen, lower alkyl or aryl of up to 8 carbon atoms; Z is a carbon-carbon single bond, a carbon-carbon double bond or a methylene group fused to C-1 and C-2 atoms and having the α-configuration; $S^1$ being methyl when Z is the methylene group or the carbon-carbon double bond.

6. A compound according to claim 5 wherein $S^1$ is methyl; each of $S^2$ and $S^3$ is hydrogen; Z is a carbon-carbon single bond.

7. A compound according to claim 5 wherein $S^1$ is methyl; $S^2$ is acyloxy; $S^3$ is hydrogen; and Z is a carbon-carbon single bond.

8. A compound according to claim 5 wherein $S^1$ is methyl $S^2$ is caproyloxy; $S^3$ is hydrogen and Z is a carbon-carbon single bond.

9. A steroid of the pregnane series having the formula:

[steroid structure]

wherein $T^1$ is hydrogen, tetrahydropyran-2-yl, tetrahydrofuran-2-yl or a hydrocarbon carboxylic acyl group containing less than 12 carbon atoms; $T^2$ is hydroxy or a hydrocarbon carboxylic acid acyloxy group containing less than 12 carbon atoms; $T^3$ is hydrogen, hydroxy or methyl; $T^2$ and $T^3$ together is the group $$\overset{\cdots O}{\underset{\vdots\cdot O}{>}}C\overset{P}{\underset{Q}{<}}$$

in which P is hydrogen or lower alkyl and Q is hydrogen, lower alkyl or aryl of up to 8 carbon atoms; $T^4$ is hydrogen or fluoro; and Z is the group

[structures shown] or [structure]

in which Y is hydrogen, phenyl or p-fluorophenyl.

10. A compound according to claim 9 wherein $T^1$ is hydrogen; $T^2$ is hydroxy; $T^3$ is α-methyl; $T^4$ is fluoro; and Z is the group

[structure]

11. A compound according to claim 9 wherein $T^1$ is hydrogen; $T^2$ and $T^3$ together is the group $$\overset{\cdots O}{\underset{\vdots\cdot O}{>}}C\overset{P}{\underset{Q}{<}}$$

in which each of P and Q is methyl; $T^4$ is hydrogen; and Z is the group

[structure]

12. A compound according to claim 11 wherein $T^1$ is hydrogen; $T^2$ and $T^3$ together is the group $$\overset{\cdots O}{\underset{\vdots\cdot O}{>}}C\overset{P}{\underset{Q}{<}}$$

in which each of P and Q is methyl; $T^4$ is fluoro; and Z is the group
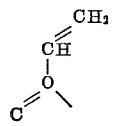
No references cited.
HENRY A. FRENCH, Primary Examiner
U.S. Cl. X.R.
195—51; 260—239.55, 345.2, 346.1, 397.4, 397.5, 999

UNITED STATES PATENT OFFICE
CERTIFICATE OF CORRECTION

Patent No. 3,468,877　　　　　　　　　　Dated September 23, 1969

Inventor(s) Alexander D. Cross

It is certified that error appears in the above-identified patent and that said Letters Patent are hereby corrected as shown below:

Column 6, line 56, "16α,17-acetonide" should be -- 16α,17α-acetonide --. Column 14, line 38, "17-norpregn" should be -- 19-norpregn --. Column 15, line 57, "[4',5';6,1]" should be -- [4',5';6,7] --. Column 15, line 58 "[4',5';6.7]" should be -- [4',5';6,7] --. Column 21, line 15, "rsidue" should be -- residue --. Column 23, lines 14-23 and Column 24, lines 39-44, the bracketed formulas should not appear. Column 24, lines 10-14, that portion of the formula appearing as

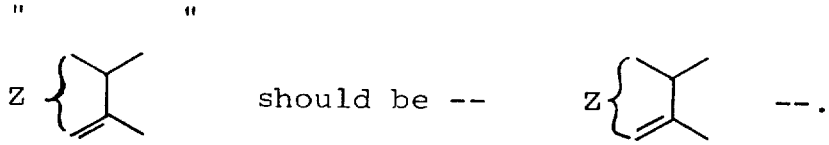

Column 25, lines 3-7,

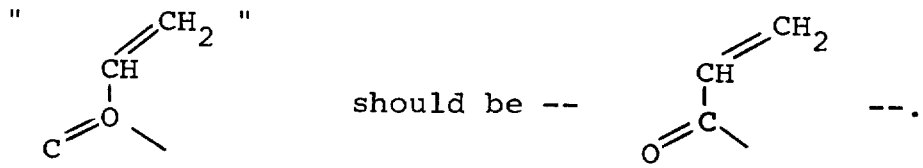

SIGNED AND
SEALED
OCT 6 - 1970

(SEAL)
Attest:

Edward M. Fletcher, Jr.　　　　　　　　　　WILLIAM E. SCHUYLER, JR.
Attesting Officer　　　　　　　　　　　　　Commissioner of Patents